June 19, 1923.
F. KRUSE
SAUSAGE TWISTING DEVICE
Filed Jan. 12, 1922
1,459,064
4 Sheets-Sheet 3
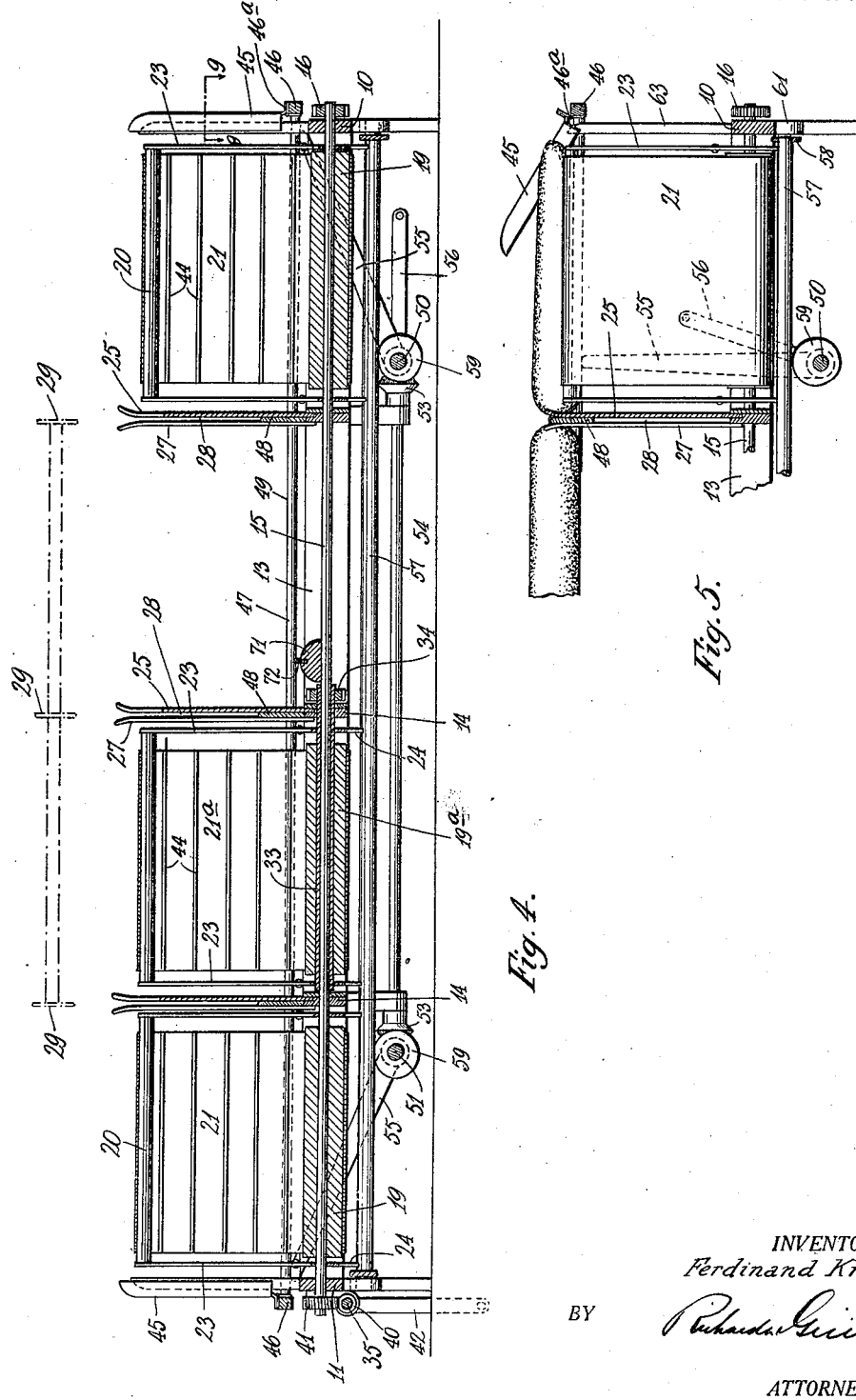
INVENTOR.
Ferdinand Kruse
BY
ATTORNEYS.

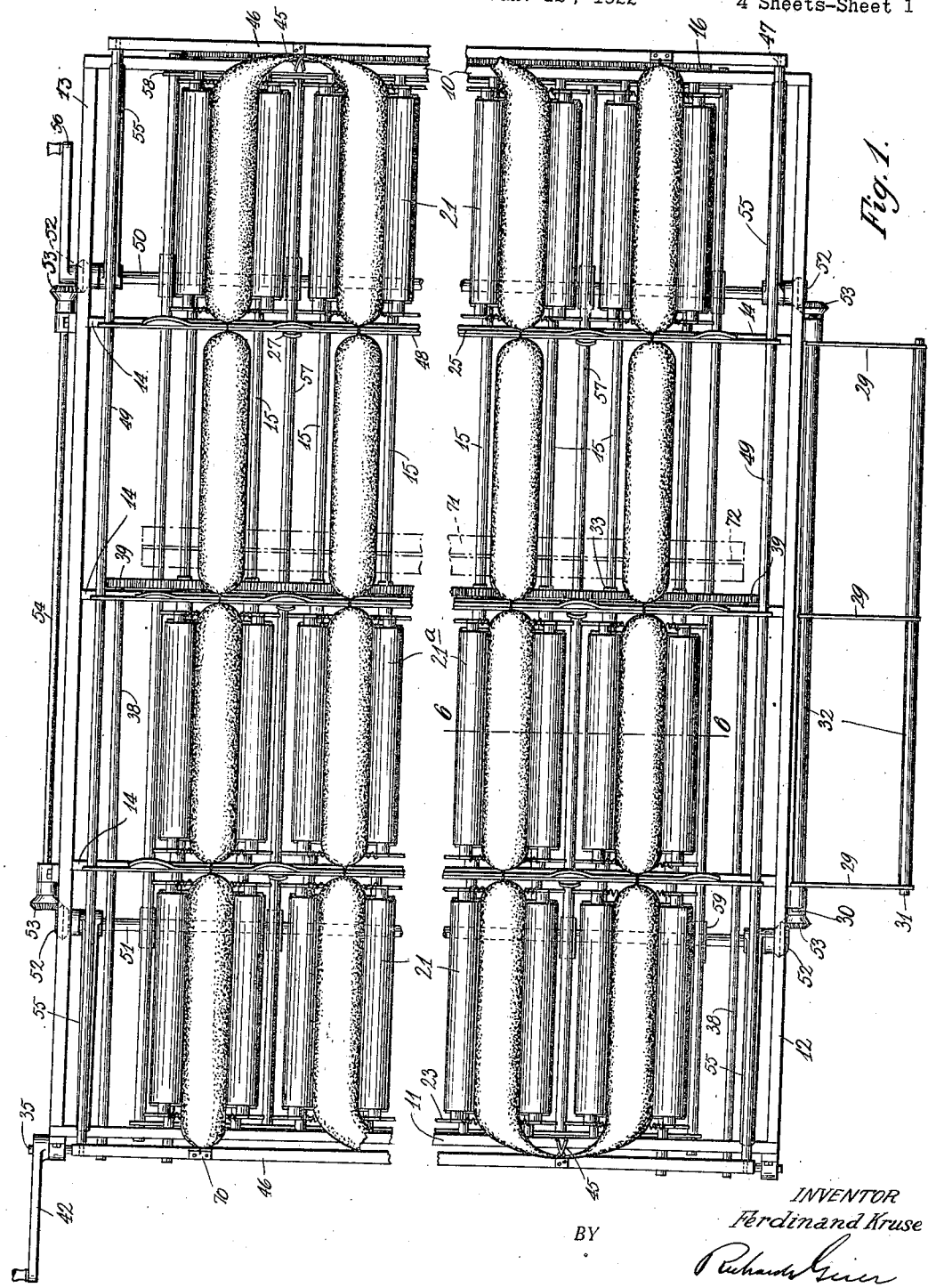

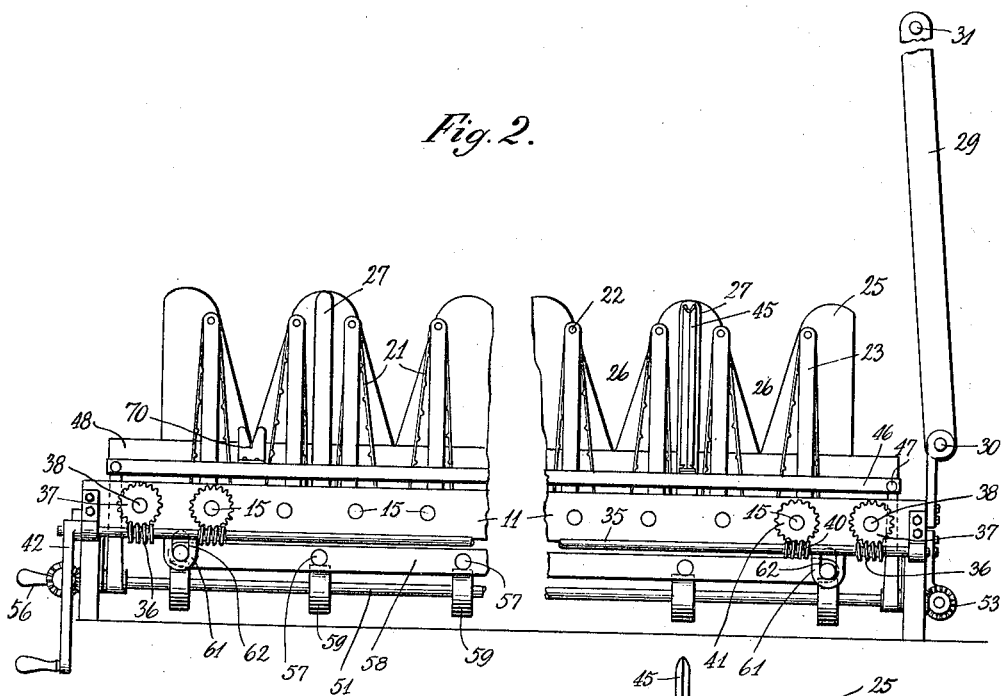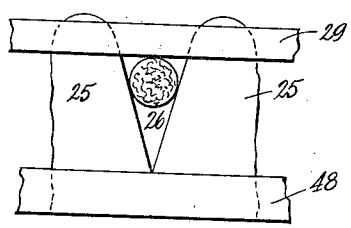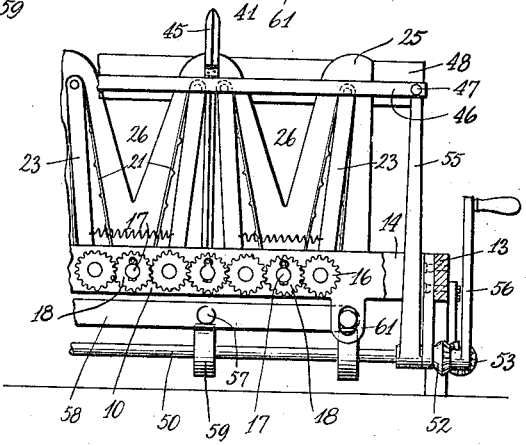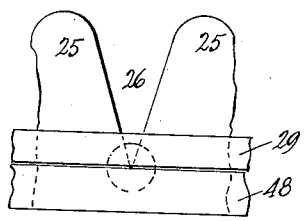

June 19, 1923.

F. KRUSE

SAUSAGE TWISTING DEVICE

Filed Jan. 12, 1922

INVENTOR.
Ferdinand Kruse
BY
ATTORNEYS.

Patented June 19, 1923.

1,459,064

UNITED STATES PATENT OFFICE.

FERDINAND KRUSE, OF PORT RICHMOND, NEW YORK.

SAUSAGE-TWISTING DEVICE.

Application filed January 12, 1922. Serial No. 528,623.

*To all whom it may concern:*

Be it known that I, FERDINAND KRUSE, a citizen of the United States, and resident of Port Richmond, in the county of Richmond and State of New York, have invented certain new and useful Improvements in Sausage-Twisting Devices, of which the following is a specification.

One of the objects of this invention is to improve upon the construction of the sausage twisting machines disclosed in my prior applications for U. S. Letters Patent Serial No. 461,879, April 16, 1921, and 479,461, June 22nd 1921.

A further object is to provide spring or other resilient means for holding the endless twisting belts of the machine in yielding frictional engagement with the sausage.

Another object is to provide an improved carrier to remove the twisted sausages from between the belts, and a further object is to provide a manual means for operating the carrier which will simultaneously operate a means for spreading or separating the opposed working surfaces of the adjacent belts to thereby allow the sausages to be readily removed from or inserted into the machine.

For the accomplishment of these and such further objects as will be apparent to those skilled in the art to which this appertains, the invention consists in the construction, combination and arrangement of parts herein specifically described and illustrated in the accompanying drawings wherein is shown a preferred embodiment of the invention but it is to be understood that changes, variations and modifications may be resorted to which fall within the scope of the claims hereunto appended.

In the drawings forming a portion of this specification:

Fig. 1 is a top plan view of the machine partially broken away through the center.

Fig. 2 is a side view of the structure shown in Fig. 1 as seen from the left.

Fig. 3 is a partial side view of the opposite side to that shown in Fig. 2.

Fig. 4 is a section on the line 4—4 of Fig. 6.

Fig. 5 is a partial section on the line 5—5 of Fig. 6.

Fig. 7 is a partial detail of the forming members showing a sausage casing at the beginning of the forming.

Fig. 8 is a similar view showing the completion of the forming operation.

Figure 6:
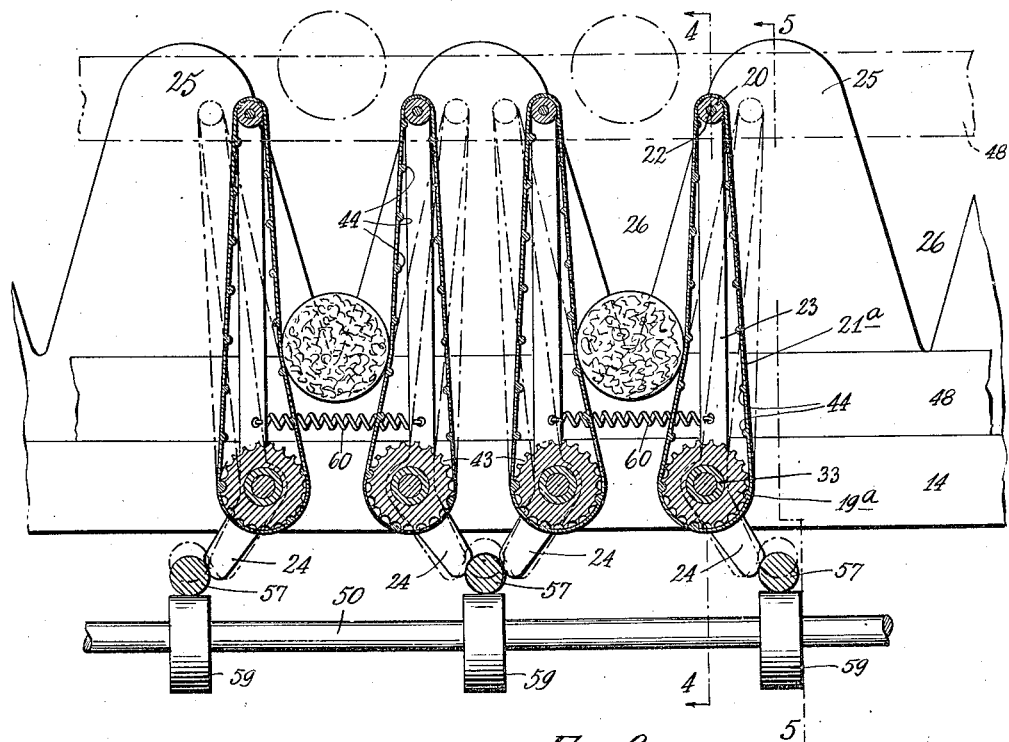
Fig. 6 is a fragmentary section on the line 6—6 of Fig. 1.
Figure 10:
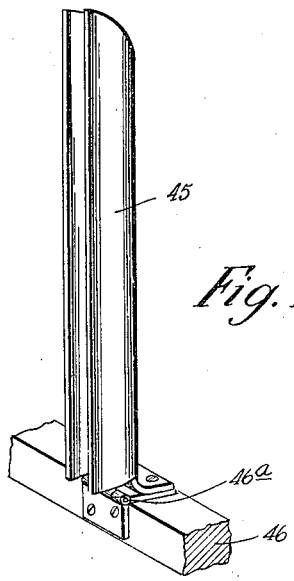
Fig. 10 is a detail of the end formers.
Figure 9:
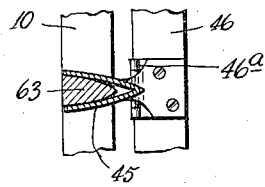
Fig. 9 is a sectional detail on the line 9—9 of Fig. 4.

Referring to the drawings, the numerals 10 and 11 indicate the side members of the machine which are joined together at their ends by the end pieces 12 and 13, between which are secured a number of suitably spaced intermediate members 14. A plurality of spaced shafts 15 are journaled in the side and intermediate members and to each of said shafts outside of the end member 10 is secured a spur gear 16 and between each of the adjacent gears 16 a stub shaft 17 is provided on each of which is mounted an idler gear 18.

Fixedly mounted adjacent the ends of the shafts 15 are a series of lower rollers 19 about which and a series of upper rollers 20 are trained a series of endless belts 21, the upper rollers being mounted to revolve upon rods 22 which extend between and are carried by a series of arms 23 journaled upon the shafts 15. The lower ends of said arms are provided with projecting fingers 24 for a purpose to be hereinafter set forth. At equal intervals across the machine are fixed longitudinally extending formers 25 which are cut away to form a plurality of V shaped openings 26, said openings being arranged in alignment with the spaces between alternate belts 21 as clearly shown in Figs. 2 and 6 of the drawing. Guides 27 are attached at their lower ends at intervals along the intermediate members 14 and are spaced transversely from the formers 25 to provide a guide way 28 adapted to receive the blades 29 of a movable former. The blades 29 are pivoted at their lower ends to a cross rod 30 mounted at one end of the machine and at their upper ends are joined by a rod 31 suitable spacing sleeves 32 being provided on the rods to hold the blades in proper position.

It will be understood that any desirable number of formers 25 and belts may be provided transversely of the machine but my preferred embodiment as shown in the drawings comprises three formers which divide the machine transversely into four spaces. The spaces adjacent the sides of the machine are provided with the belts 21 while one of the spaces adjacent the centre of the machine is provided with a similar series of belts 21ᵃ which are mounted in the same manner as the belts 21 but which are arranged to rotate in an opposite direction to the end belts 21 in the following manner.

Each of the rollers 19ᵃ are bored out to receive a tubular sleeve 33 on the outer end of which is secured a spur gear 34, the arrangement of spur gears and idlers for the belts 21ᵃ being identical with those for the belts 21. A longitudinal shaft 35 extends along the outside of the side member 11 and is provided adjacent the ends of the machine with worms 36 preferably having left handed threads and which mesh with worm wheels 37 mounted on transverse shafts 38 extending to the center of the machine and provided with spur gears 39 which drive the chain of gears 34 and through them the rollers 19ᵃ and belts 21ᵃ. Adjacent the worms 36 are a second pair of worms 40 which it will be noted are provided with right hand threads and mesh with the worm wheels 41 mounted on the projecting ends of the two end shafts 15 extending to the opposite side of the machine and which as hereinbefore set forth are provided with the gears 16. Any desirable means such as the handle 42 may be provided to rotate the shafts 35 or suitable power means may be employed. It will thus be obvious that rotation of the shaft 35 will cause the belts 21ᵃ to be rotated in the opposite direction to the belts 21. As shown in Fig. 6 the rollers 19 and 19ᵃ may be provided with grooves 43 which are adapted to engage with strips 44 arranged transversely of the belts to ensure the positive rotation of the belts and prevent undue slipping.

The side members 46 of the lifting carriage to be hereinafter described are preferably provided with former members 45 arranged alternately in alignment with the V shaped spaces 26 of the intermediate formers and the formers 45 are also alternately arranged with respect to each other on the respective side members 46. These formers 45 are preferably formed of sheet metal bent to form a V shape in horizontal section and are hingedly mounted as at 46ᵃ on the side bars 46 of a sausage lifting carriage which consists of the side bars 46 connected at the ends by the transverse rods 47.

Longitudinal strips 48 are secured to the rods and extend into the guide ways 28, spacing sleeves 49 being provided to hold the strips in proper alignment. Means for raising the sausage lifting carriage are provided and consist of a pair of longitudinally extending shafts 50, 51 to the ends of which are fixed the mitre gears 52 meshing with corresponding gears 53 secured to a pair of transverse shafts 54 journaled in suitable bearings on the end pieces 12 and 13. Each of the shafts 50 and 51 are provided with a pair of lifting arms 55 in alignment with and adapted to engage the under side of the outer spacing sleeves 49 mounted on the rods 47. A suitable handle 56 is secured to one end of the shaft 50 for rotating the same.

Referring to Fig. 6 it will be noted that the downwardly projecting fingers 24 extend toward and are adapted to be engaged by the transverse rods 57 which are held in proper alignment by means of end pieces 58, and by lugs 61 projecting downwardly from the side pieces 10 and 11 and having elongated slots 62 therein in which the ends of the end shafts 57 are received (see Fig. 2).

Secured along the shafts 50 and 51 are a series of cams 59 which are in alignment with the rods 57 whereby rotation of the shafts 50 and 51 will cause the rods 57 to be moved upwardly from the full line positions shown in Fig. 6 to the dotted line positions, thus causing the rods to thrust the fingers 24 apart and cause the arms 23 to be moved apart carrying the belts 21 to the dotted line positions, thus allowing for the free insertion or removal of the casings between the belts. Any suitable means such as the springs 60 may be provided to hold the belts yieldingly in frictional engagement with the casings.

Arranged along the side pieces 10 and 11 in alignment with the end formers 45 are mounted upwardly projecting combined guide and actuating members 63 which extend within and are partially encased by the V shaped formers 45 when the sausage lifting casing is in the position shown in Fig. 4 and therefore hold the formers in an upright position. When the lifting carriage is raised to its upper position as shown in Fig. 5 the formers will obviously drop inwardly due to the manner in which they are hinged, thus facilitating the easy removal of the casings.

The operation of the machine is as follows, assuming that the operator has actuated the handle 56 to raise the lifting carriage to the position shown in Fig. 5, or the dotted line position in Fig. 6, the rotation of the shafts 50 and 51 will cause the belts 21 and 21ᵃ to be separated against the action of the springs 60 to the dotted line position shown in Fig. 6. The operator then places a casing upon the carriage twisting and securing the end in the notched bracket 70 and threading the casing around the end formers in the manner indicated in Fig. 1, after which the handle 56 is actuated to lower the carriage and allow the casings to be lowered between the opposed belts which are forced together by the springs 60. At the same time the end formers 45 are moved from the position shown in Fig. 5 to that shown in Fig. 6 by the guide pieces 63. Grasping the upper end of the movable former frame the operator pulls it down upon the casings and at the same time starts to turn the handle 42 thus causing the belts to be actuated to twist the casings as they are forced down into the V shaped openings 26 in the fixed formers 25 by the blades 29. After having forced the casings down to the full line position shown in Fig. 6 when the twisting operations will be completed, the operator then moves the movable formers upwardly and to the position shown in Fig. 2 and by turning the handle 56 moves the lifting arms 55 to the dotted line position shown in Fig. 4, thus raising the lifting carriage and at the same time through the medium of the cams 59 and shafts 57 forcing the belts 21 and 21ª apart. It will be understood that the throw of the cam is timed to open the belts slightly before the carriage commences to raise. When the carriage has reached its upward limit of travel the formers 45 will fall inwardly to permit the ready removal of the casings. It will be understood that due to the twisting of the casing because of the opposite rotation of the adjacent projecting ends and the pressure against the formers 45 that the casing will be divided into links by the end formers.

A smoke stick 71 will be placed at the center of the machine upon the lifting carriage and as the carriage is raised will engage the center twists of the casings in notches cut into a metal strip 72 inserted into the stick. The stick holding the casings is then taken from the machine and carried to the smoke house another stick is placed on the carriage and the machine is ready for another twisting operation.

Having thus described my invention what I claim as new and desire to secure by Letters Patent of the United States is:

1. In a sausage twisting machine a plurality of endless belts adapted to receive a sausage casing between them and means to normally hold said belts yieldingly in frictional engagement with said casing.

2. In a sausage twisting machine, a plurality of endless belts adapted to receive a sausage casing between them, means to normally urge opposed surfaces of adjacent belts towards each other and in yielding frictional engagement with said casing and means to force said surfaces away from each other.

3. In a sausage twisting machine, a plurality of endless belts adapted to receive a sausage casing between them, means to normally urge opposed surfaces of adjacent belts towards each other and in yielding frictional engagement with said casing and manually operable means to force said surfaces away from each other.

4. In a sausage twisting machine, a plurality of endless belts arranged in horizontally aligned series of cooperating pairs of belts, the members of each pair of belts being spaced apart to provide a space in which the sausage casing is received and the opposed surfaces of each pair of belts cooperating to simultaneously engage and twist said casing at a plurality of spaced points.

5. In a sausage twisting machine, a plurality of endless belts arranged in horizontally aligned series of cooperating pairs of belts and means to normally urge the opposed surfaces of each of said pairs into yielding frictional engagement with a sausage casing.

6. In a sausage twisting machine, a plurality of endless belts arranged in pairs, a driving roller and an idler roll for each belt, said idler roll mounted on a pivoted arm and yielding means for normally urging the pivoted arms of each pair of belts toward each other whereby the opposed surfaces of each pair of belts will be caused to frictionally engage a sausage casing.

7. In a sausage twisting machine, a plurality of endless belts arranged in pairs, a driving roller and an idler roll for each belt, said idler roll mounted on a pivoted arm and yielding means for normally urging the pivoted arms of each pair of belts toward each other whereby the opposed surfaces of each pair of belts will be caused to frictionally engage a sausage casing; means to force said arms apart against the action of said yielding means.

8. In a sausage twisting machine, a plurality of endless belts arranged in horizontally aligned series end formers at the sides of the machine, intermediate formers between each series of belts and means to hold the end of the sausage casing.

9. In a sausage twisting machine, a plurality of endless belts arranged in horizontally aligned series of cooperating pairs of belts, means for normally urging the cooperating members of said pair of belts toward each other, means for forcing said members away from each other, a sausage lifting carriage adapted to raise the sausages from between said belts and means for simultaneously actuating said carriage raising and belt separating means.

10. In a sausage twisting machine, a plurality of vertically arranged endless belts, adapted to engage a sausage casing, a vertically movable sausage lifting carriage and means to raise said carriage and lift the sausages out of engagement with said belts.

11. In a sausage twisting machine, a plurality of vertical endless belts arranged in horizontally aligned parallel series, stationary formers intermediate the series of belts, guide members adjacent said formers, movable formers cooperating with said stationary formers and passing between said stationary formers and guide members, and a sausage lifting carriage situated between said guide members and stationary formers, below said movable formers.

12. In a sausage twisting machine, a plurality of vertical endless belts arranged in horizontally aligned parallel series, stationary formers intermediate the series of belts, movable formers cooperating with said stationary formers and a plurality of hinged formers located at the outer sides of the machine adjacent the outer horizontal series of belts.

13. In a sausage twisting machine, a plurality of endless belts arranged in horizontally aligned parallel series, stationary formers intermediate the series of belts, said formers provided with a plurality of V shaped openings, and a plurality of hinged formers alternately arranged on opposite sides of the machine in alignment with said openings.

14. In a sausage twisting machine, a plurality of vertically arranged endless belts adapted to engage a sausage casing, a vertically movable sausage lifting carriage and a plurality of hinged formers carried by the sides of said carriage.

15. In a sausage twisting machine, a plurality of vertical endless belts arranged in horizontally aligned parallel series, stationary formers intermediate the series of belts, said formers provided with a plurality of transversely aligned V shaped openings, a sausage lifting carriage adapted to lift the sausages out of engagement with said belts and vertically extending hinged formers carried by said carriage adapted to drop inwardly when said carriage is raised to facilitate the removal of said sausages from the machine.

16. In a sausage twisting machine, a plurality of vertical endless belts arranged in horizontally aligned parallel series, stationary formers intermediate the series of belts, said formers provided with a plurality of transversely aligned V shaped openings, a sausage lifting carriage adapted to lift the sausages out of engagement with said belts, vertically extending hinged formers carried by said carriage adapted to drop inwardly when said carriage is raised to facilitate the removal of said sausages from the machine, and means to restore said formers to a vertical position when said carriage is lowered.

17. In a sausage twisting machine, a vertically movable sausage lifting carriage, a plurality of formers carried by said carriage, said formers hinged in offset relation to said carriage whereby they are normally adapted to drop inwardly when said carriage is raised and guide members carried by said machine adapted to engage said formers and hold them in a vertical position.

Signed at New York in the county of New York and State of New York this 15th day of December A. D. 1921.

FERDINAND KRUSE.